United States Patent
Resnick

(10) Patent No.: US 10,836,270 B2
(45) Date of Patent: Nov. 17, 2020

(54) DRONE IMPLEMENTED BORDER PATROL

(71) Applicant: BRINC Drones, Inc., Las Vegas, NV (US)

(72) Inventor: Blake Resnick, Las Vegas, NV (US)

(73) Assignee: BRINC DRONES, INC., Las Vegas, NV (US)

( * ) Notice: Subject to any disclaimer, the term of this patent is extended or adjusted under 35 U.S.C. 154(b) by 0 days.

(21) Appl. No.: 16/617,873

(22) PCT Filed: Jun. 8, 2018

(86) PCT No.: PCT/US2018/036752
§ 371 (c)(1),
(2) Date: Nov. 27, 2019

(87) PCT Pub. No.: WO2018/227153
PCT Pub. Date: Dec. 13, 2018

(65) Prior Publication Data
US 2020/0231054 A1    Jul. 23, 2020

Related U.S. Application Data

(60) Provisional application No. 62/517,726, filed on Jun. 9, 2017.

(51) Int. Cl.
*B60L 53/36* (2019.01)
*B60L 53/68* (2019.01)
(Continued)

(52) U.S. Cl.
CPC ............ *B60L 53/36* (2019.02); *B60L 53/66* (2019.02); *B60L 53/68* (2019.02); *B64C 39/024* (2013.01); *B64D 1/12* (2013.01); *G05D 1/0022* (2013.01); *G05D 1/0653* (2013.01); *G08G 5/0013* (2013.01); *G08G 5/0069* (2013.01);
(Continued)

(58) Field of Classification Search
CPC .......... B60L 53/36; B60L 53/68; B60L 53/66; B60L 2200/10; B64C 39/024; B64C 2201/042; B64C 2201/126; B64C 2201/128; B64C 2201/127; G08G 5/0013; G08G 5/0069; G08G 5/0086; G05D 1/0653; G05D 1/022; B64D 1/12
See application file for complete search history.

(56) References Cited

U.S. PATENT DOCUMENTS 9,145,207 B2 * 9/2015 Moschetta ............. B64C 25/36
9,643,729 B2 * 5/2017 Walter-Robinson ........................ B64D 27/24

(Continued)

OTHER PUBLICATIONS

International Search Report and Written Opinion isssued in copending International Application No. PCT/US2018/036752 dated Aug. 30, 2018 in 15 pages.

*Primary Examiner* — Mary Cheung
(74) *Attorney, Agent, or Firm* — Procopio Cory Hargreaves and Savitch LLP; Pattric J. Rawlins

(57) ABSTRACT

The drone implemented border patrol solution is projected to be more effective at preventing successful border penetrations over very long distances than any attempted solution. It requires functionally zero infrastructure investment. It can be deployed in six months or less and it costs less than $100,000 a mile to implement (vs. 15 million a mile for a physical wall, or 4 million a mile for a virtual fence (a 97% price reduction)).

17 Claims, 10 Drawing Sheets

(51) Int. Cl.
*G08G 5/00* (2006.01)
*B64C 39/02* (2006.01)
*B64D 1/12* (2006.01)
*G05D 1/00* (2006.01)
*G05D 1/06* (2006.01)
*B60L 53/66* (2019.01)

(52) U.S. Cl.
CPC ........ *G08G 5/0086* (2013.01); *B60L 2200/10* (2013.01); *B64C 2201/042* (2013.01); *B64C 2201/126* (2013.01); *B64C 2201/127* (2013.01); *B64C 2201/128* (2013.01)

(56) References Cited

U.S. PATENT DOCUMENTS

| | | | |
|---|---|---|---|
| 2014/0236390 A1* | 8/2014 | Mohamadi | B64C 29/00 701/2 |
| 2015/0362917 A1* | 12/2015 | Wang | G05D 1/0022 701/2 |
| 2016/0332748 A1 | 11/2016 | Wang | |
| 2017/0144758 A1 | 5/2017 | Myslinski | |
| 2017/0210470 A1* | 7/2017 | Pardell | B08B 7/04 |
| 2018/0267561 A1* | 9/2018 | Trench | G05D 1/102 |

\* cited by examiner (1)
DRONE IMPLEMENTED BORDER PATROL

BACKGROUND

Field of the Invention

The present disclosure generally pertains to autonomous flight vehicles ("drones"). More specifically, it pertains to an application of drone swarming technology to security and international border control.

Related Art

Current border control strategies include routine agent patrols, virtual wall technology and a partially built physical wall. In the US routine agent patrols are ineffective (stopping fewer than 30% of border penetrations) and immensely expensive due to salaries which amount to upwards of 7 billion dollars a year domestically. Virtual wall technology requires immense infrastructure investment to implement, has never been implemented successfully in the US and can be easily fooled by border penetrators. The US's partially built wall can be successfully defeated by 30 ft of rope, costs 10's of millions a mile to build and covers less than a quarter of the border. It is not much better elsewhere in the world. In short, current border control strategies are extremely expensive, ineffective and obsolete.

Therefore, what is needed is a system and method that overcomes these significant problems found in the conventional systems as described above.

SUMMARY

To solve the problems associated with conventional border patrol, described herein are systems and methods for drone implemented border patrol. In one embodiment, the system comprises plural drones, plural base stations and plural control centers. Each drone is equipped with a visible light camera, thermal imaging camera, two-way audio system, and a deterrent module. They are capable of seeking out, verbally communicating with, and when necessary discharging a nonlethal deterrent to immobilize or incapacitate intruders until border agents arrive.

Base stations are placed at increments along the border. After landing, drones are recharged by the base stations. Base stations also relay live video, audio, and control information from the drones to other base stations and to manned control centers. Manned control centers house drone operators who have the ability to communicate with subjects via the drone, control the drone, and send border security agents to respond in person.

During operation, the drones function autonomously (patrolling and recharging) until suspicious activity is detected by computer vision and narrow artificial intelligence ("AI") software. At any point, the control center operator may take remote control of the drone and guide the drone into a desirable position for communication with the subject in question. In the event the subject ignores or avoids the drone, additional drones may be deployed to track the subject. Also, the control center server may request that border security agents respond in person. A deployment of the deterrent module may also be evaluated by the control center server.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide for drone implemented border security. For example, one method disclosed herein allows for a drone to patrol the border area and identify a subject such as a person or a vehicle. The drone alerts a control center server and evaluation of the subject takes place. The server may interact with the subject via speakers and sensors on the drone and border patrol agents may be requested to be deployed to the scene. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
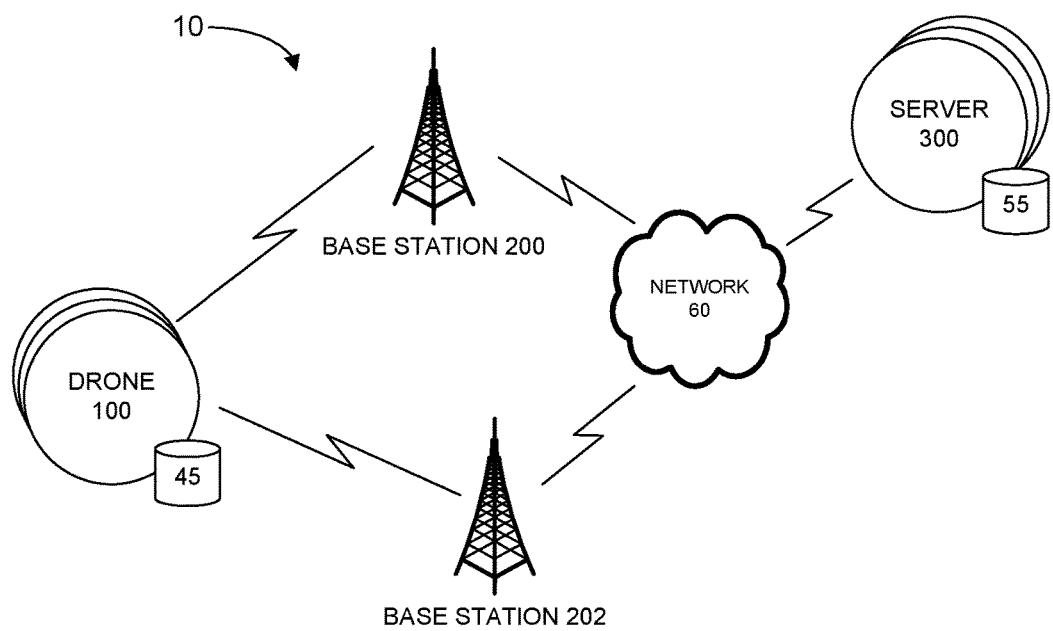
FIG. 1 is a network diagram illustrating an example system for drone implemented border patrol according to an embodiment of the invention.

FIG. 1 is a network diagram illustrating an example system 10 for drone implemented border patrol according to an embodiment of the invention. In the illustrated embodiment, the system 10 comprises a plurality of drones 100, each having a respective data storage area 45. The drones 100 wirelessly communicate with a plurality of base stations 200 and 202, which in turn communicate with one or more servers 300, each having a respective data storage area 55, via a network 60. While in operation the system 10 may include multiple drones 100, multiple base stations 200, multiple networks 60 (wired or wireless or any combination thereof), and multiple servers 300, for simplicity of explanation, the following description will refer to these elements in the singular. In some instances, the elements may be referred to in the plural to emphasize certain aspects of the description.

The drone 100 is configured to communicate with one or more base stations 200 that the drone 100 is nearest to by utilizing technology similar to data roaming. As the drone 100 moves closer to a new base station 200 in the network, it would execute a soft handoff to maintain good signal strength. At any time the drone 100 might be transmitting and/or receiving information from/to the flight control module 115, the flight sensor suite 120, the localization modules 125, the video camera module 130, the analysis module 135, the thermal imaging module 140, the microphone 145, the deterrent module 155, the speaker 160, the processor 175 and the data storage area 180.

The base station 200 is configured to communicate with one or more drones 100 and with other base stations 200 and with one or more control center servers 300. Two or more base stations 200 form a mesh network as described below. At any time the base station 200 might be transmitting and/or receiving information from/to the base station charging module 210, drone charging module 220, camera module 235, microphone 240, speaker 245, processor 255 and data storage area 260. Base station 200 is also configured to support one or more drones 100 and recharge drones 100.

The control center 300 is configured to communicate with one or more drones 100 and one or more base stations 200. In one embodiment, the control center 300 is a virtual entity that exists in the cloud, e.g., on a remote server communicatively coupled via one or more networks. In one embodiment, the base station 200 mesh network data is transmitted through a network (e.g., the Internet) to and from the control center 300. At any time the control center 300 might be transmitting and/or receiving information from/to the user interface hardware 305, the drone control module 310, the flight data viewing module 315, the real time video module 320, the real time audio module 325, the anomaly alert module 330, the processor 335 and the data storage area 340.

The network 60 may be a public network, a private network, a wired network, a wireless network, or any combination of public and private and wired and wireless networks. In one embodiment, the network 60 may include the Internet. The network 60 is configured to enable one or more base stations 200 to communicate with the control center server 300.

Figure 2:
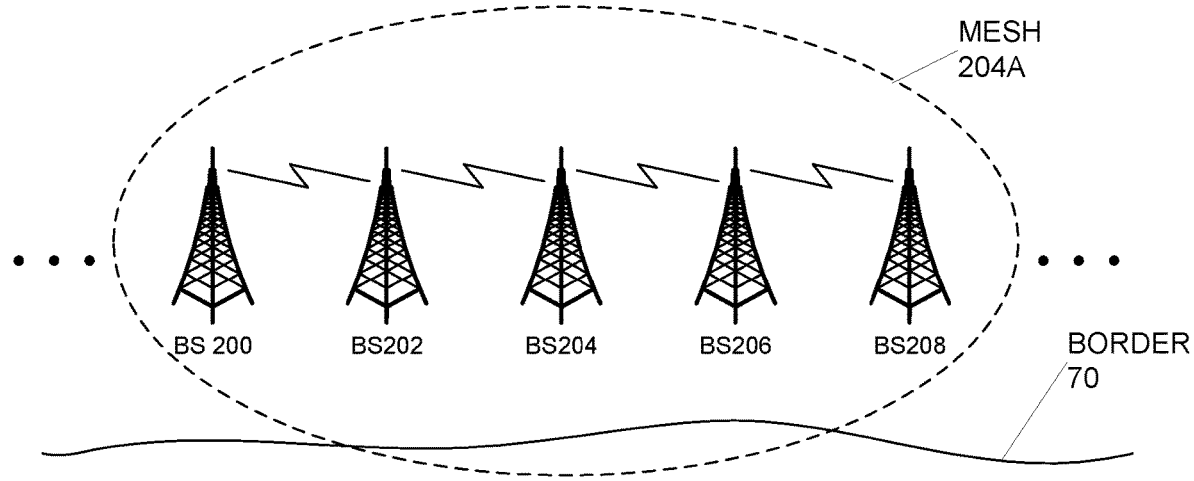
FIG. 2 is a network diagram illustrating an example mesh network of base stations according to an embodiment of the invention.

FIG. 2 is a network diagram illustrating an example mesh network 204A of base stations 200 according to an embodiment of the invention. In the illustrated embodiment, the mesh 204A comprises a plurality of base stations 200 located along a border 70. In the illustrated embodiment, the individual base stations 200, 202, 204, 206 and 208 of the mesh network 204A relay messages using either a flooding technique or a routing technique. The network 204A also may utilize self-healing algorithms such as Shortest Path Bridging. Advantageously, self-healing algorithms enable the network 204A to operate even when one or more base stations 200 go offline.

Figure 3:
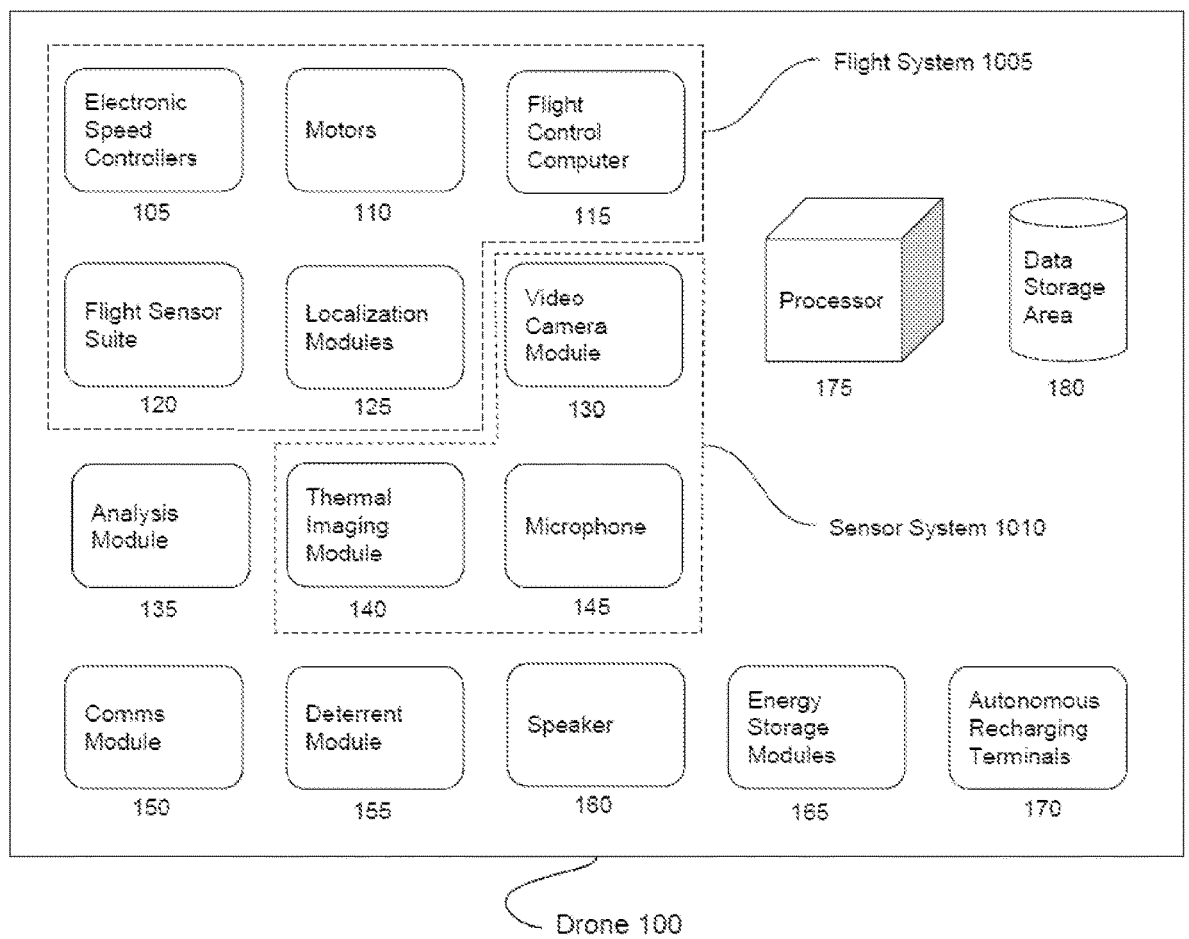
FIG. 3 is a block diagram illustrating an example drone according to an embodiment of the invention.

FIG. 3 is a block diagram illustrating an example drone 100 according to an embodiment of the invention. Each drone 100 may be capable of capturing, transmitting and processing light, capturing, transmitting and processing thermal signatures, capturing, transmitting and processing sound, emitting sound, flying (autonomously if necessary), landing autonomously to charge and/or download data, communicating with base stations 200, and deterring would be aggressors. This functionality is executed by a number of modules and systems that comprise the drone 100.

Electronic speed controllers 105 are used to vary the speed of the motors 110 onboard the drone 100 based on a signal that dictates the desired motor RPM or power level. This signal is supplied by the flight control computer 115. The electronic speed controllers 105 are powered by the drone's energy storage modules 165.

In one embodiment, the electronic speed controllers 105 generate a three-phase low voltage source of energy to power the motors 110. The electronic speed controllers 105 might require a conventional pulse width modulated signal whose pulse width varies from 1 ms to 2 ms and operates at a nominal 50 Hz to determine desired motor speed.

In another embodiment, the electronic speed controllers 105 generate a simple variable DC voltage to power the motors 110. This might be achieved utilizing a variable transformer or a chopper circuit. The electronic speed controllers might require a conventional pulse width modulated signal whose pulse width varies from 1 ms to 2 ms and operates at a nominal 50 Hz to determine output voltage.

The motors 110 onboard the drone 100 convert electrical energy from the drone's energy storage modules 165 to mechanical energy that is used to produce thrust on the craft. They input the output energy of the electronic speed controllers 105.

In one embodiment, the motors 110 are brushless outrunner motors. The motors might contain a gearbox.

In another embodiment, the motors 110 are brushless inrunner motors. The motors might contain a gearbox.

In another embodiment, the motors 110 are brushed DC motors. The motors 110 might contain a gearbox.

The flight control module 115 inputs data from the flight sensor suite 120, localization modules 125, and external control input which would be received by the comms module 150. The flight control module 115 then translates the received data into instantaneous desired motor RPM's which are sent to the electronic speed controllers 105 and later to the motors 110. In other words, flight control module 115 is primarily responsible for translating high level commands (like go to these coordinates) into executable instructions for the motors.

In one embodiment, the flight control module 115 is onboard the drone 100 and directly connected to the flight sensor suite 120, localization modules 125, and electronic speed controllers 105. It may contain a processor and memory and accomplish calculations in real time.

In another embodiment, the flight control module 115 is on the base station 200. It may be connected to the flight sensor suite 120, localization modules 125, and electronic speed controllers 105 via the comms module 150.

In another embodiment, the flight control module 115 is a part of the control center 300. It may be connected to the flight sensor suite 120, localization modules 125, and electronic speed controllers 105 via the comms module 150, the base station 200 and/or the network.

In another embodiment, the flight control module 115 is virtual and all computations are done in the cloud, e.g., on a remote server communicatively coupled via one or more networks. It may be connected to the flight sensor suite 120, localization modules 125, and electronic speed controllers 105 via the comms module 150, the base station 200, the network, and/or the control center.

The flight sensor suite 120 senses the environment around the drone 100 and reports that information to the flight control module 115, analysis module 135 and comms module 150.

In one embodiment, the flight sensor suite 120 might comprises one or more accelerometers, gyroscopes, magnetometers, ultrasonic sensors, lidars, radars, air flow meters, altimeters, air speed sensors, inertial navigation systems, laser rangefinders, hall effect sensors, turbine speed sensors, voltage detectors, current detectors and/or moisture sensors.

The localization modules 125 are configured to determine the physical location of the drone 100 in the local environment and with respect to one or more base stations 200 within the network 204A.

In one embodiment, the meter level localization system 125 is comprised of a GPS module, GPS RTK module, and/or IMU based localization module (for long range, base station 200 to base station 200 journeys without the need for ultra high accuracy).

In another embodiment, the drone 100 is also equipped with an IR based centimeter level localization system for drone landing operations. The IR based centimeter level localization system is comprised of an IR camera, processor and memory on the drone 100 and an IR beacon (comprised of a cluster of IR leds) on the base station 200. The meter level component of the localization module 125 is used to position the drone 100 over the top of a base station 200, then the IR camera scans for the IR led cluster and commands the flight control module 115 to land on top of the IR cluster. The flight control computer 115 is responsible for plotting a path towards the IR led cluster. The GPS and IR camera units are connected to the flight control module 115 and to the comms module 150.

In another embodiment, the drone 100 is also equipped with a passive visual light based centimeter level localization system for drone landing operations. The visual light based centimeter level localization system is comprised of a camera, processor and memory on the drone 100 and a one or more tracking markers on the base station 200. The meter level component of the localization module 125 is used to position the drone 100 over the top of a base station 200, then the camera scans for the tracking markers and commands the flight control module 115 to land on the base station 200. The flight control computer 115 is responsible for plotting a path towards the intended landing spot based on the calculated location of the drone 100. The GPS and camera units are connected to the flight control module 115 and to the comms module 150.

The video camera module 130 detects visible light, translates that visible light into computer readable data and sends the data to the drone's comms module 150 and analysis module 135. The video camera module 130 might also contain a single or multi axis powered gimbal.

In one embodiment, the video camera module 130 is comprised of a 1080 p at 60 fps CMOS sensor based camera that outputs H.264 video.

The analysis module 135 is configured to run active computer vision on the data output from the video camera module 130 and the thermal imaging module 140. The analysis module 135 is configured to analyze the live conventional/thermal video feed to identify one or more anomalies, automatically accomplish facial recognition tasks, and perform targeting for the deterrent module 155. In one embodiment, an anomaly is a vehicle such as a car, truck, van or a human being. If a person is detected, an onboard facial recognition algorithm will attempt to identify the person. In one embodiment, the facial recognition algorithm works by comparing captured facial features with the U.S. Department of State's facial recognition database. In the event of a successful identification, the video analysis module 130 pings the control center 300 through the comms module 150. This would provide the drone operator with the identity of the person encountered by the drone 100 and his/her background. In one embodiment, the analysis module 135 would also perform computer vision based target tracking to assist in the deployment of the deterrent module 155. In the event of an anomaly detection, the video analysis module 130 sends a message to the control center 300 through the comms module 150. The analysis module 135 also commands the flight control module 115 to stop progressing on the standard flight path and transition to loiter mode to await operator instruction.

In one embodiment, the analysis module 135 accomplishes all computer vision and other analysis tasks onboard the drone 100, for example by using the main drone processor or a separate dedicated onboard processor or separate dedicated core of the main drone processor.

In another embodiment, the analysis module 135 could be physically located on the base station 200. In this case all computer vision processing work would be done offboard the drone 100. The drone 100 would transmit video data to the base station 200, which would process the data and, if necessary, send a command to the drone 100 to loiter until further instructions are received, and if necessary, send a separate command to the control center server 300 identifying the anomaly in the event of a detection.

In another embodiment, the analysis module 135 could be physically located within the control center 300. In this case all computer vision processing work would be done offboard the drone 100. The drone 100 would transmit video data to the control center 300, which would process the data then send a command to the drone 100 to loiter until further instructions are received.

In another embodiment, the analysis module 135 could be virtual with all processing happening in the cloud, e.g., on a remote server communicatively coupled via one or more networks. In this case all computer vision processing work would be done offboard the drone 100. The drone 100 would transmit video data to the cloud, e.g., on a remote server communicatively coupled via one or more networks, which would process the data then send a command to the drone 100 to loiter until further instructions are received and send a separate command to the control center server 300 warning of an anomaly in the event of a detection.

The thermal imaging module 140 detects radiation in the long-infrared range of the electromagnetic spectrum and produces images of that radiation. This enables the camera to observe the environment with or without light. The thermal imaging module 140 also translates the received sensor input into computer readable data and sends the data to the drone's comms module 150 and analysis module 135. The thermal imaging module 140 might also contain a single or multi axis powered gimbal.

In one embodiment, the thermal imaging module is comprised of an uncooled microbolometer sensor based camera that outputs H.264 or analog video.

In another embodiment, the thermal imaging module is comprised of a cooled semiconductor sensor based camera that outputs H.264 or analog video.

The microphone 145 is a transducer that converts sound into a computer readable electrical signal.

In one embodiment, the microphone 145 is a dynamic microphone, which is connected to the processor 175, data storage area 180, and comms module 150. The processor 175 and data storage area 180 may compress the audio input with the help of an audio codec and/or run noise cancellation.

In another embodiment, the microphone 145 is a condenser microphone, which is connected to the processor 175, data storage area 180, and comms module 150. The processor 175 and data storage area 180 may compress the audio input with the help of an audio codec and/or run noise cancellation.

In another embodiment, the microphone 145 is a piezoelectric microphone, which is connected to the processor 175, data storage area 180, and comms module 150. The processor 175 and data storage area 180 may compress the audio input with the help of an audio codec and/or run noise cancellation.

The comms module 150 is a wireless transceiver that is used to transmit and receive data from other transceivers, transmitters or receivers. It is capable of communicating with other drones 100 and base stations 200. The comms module 150 is networked with the flight control module 115, the flight sensor suite 120, the localization modules 125, the video camera module 130, the analysis module 135, the thermal imaging module 140, the microphone 145, the deterrent module 155, the speaker 160, the processor 175 and the data storage area 180.

In one embodiment, the comms module 150 is a 5 ghz 1 gigabit 1 watt mimo wifi transceiver connected to two 4 element skew planar 5 ghz antennas.

The deterrent module 155 is a subsystem of the drone 100 designed to limit the escalation of conflict and limit the risk security officers face when responding to dangerous situations. In one embodiment, the deterrent module 155 can be triggered through the comms module 150. The deterrent module 155 may contain a single or multi axis powered gimbal. The actuation of this powered gimbal may be partially or fully determined by the target tracking feature of the analysis module 135 or the comms module 150. The gimbal functions to autonomously track (and aim on) potential targets, whenever they are detected by the target tracking feature of the analysis module 135.

In one embodiment, the deterrent module 155 is comprised of a high voltage generator and high voltage delivery system. The high voltage generator may comprises a flyback generator based module. The delivery system may comprises a conventional TASER X26 cartridge, Bolt cartridge or X2 cartridge.

In another embodiment, the deterrent module 155 is comprised of an irritant and irritant delivery system. The irritant may include a potent scent, pepper spray and/or tear gas. The delivery system might take the form of a spray, mist, projectile or jet.

In another embodiment, the deterrent module 155 is comprised of a launcher and non-lethal rounds which are designed to incapacitate. Rubber bullets, rubber buckshot, soft polymer rounds, wax bullets, plastic bullets, beanbag rounds, sponge grenades, and rubber bullets along with their requisite launchers might be implemented.

In another embodiment, the deterrent module 155 utilizes a direct energy approach to incapacitate a target. This might include the implementation of an electromagnetic weapon, laser weapon, microwave weapon, particle beam weapon, sonic weapon and/or plasma weapon.

In another embodiment, the deterrent module 155 utilizes a sonic approach to incapacitate a target. This might include the implementation of a directional 30°-60° 2.5 kHz beam of sound.

The speaker 160 is designed to convert an electrical audio signal into sound. The speaker 160 can be triggered through the comms module 150 or by the processor 175 and data storage area 180. The speaker is capable of playing pre-recorded sounds or real time audio transmissions.

In one embodiment, the speaker 160 comprises a conventional electro-mechanical loudspeaker and potentially an audio amplifier.

In another embodiment, the speaker 160 comprises an electrostatic loudspeaker and potentially an audio amplifier.

In another embodiment, the speaker 160 comprises a highly directional ultrasonic speaker potentially mounted on a gimbal designed to track the communications target.

In another embodiment, the speaker 160 comprises a plasma speaker.

The energy storage modules 165 are designed to store electricity for use onboard the drone 100.

In one embodiment, the energy storage modules 165 contain a bank of lithium polymer batteries to power all flight systems and secondary electrical components. The energy storage modules 165 might also contain a dedicated lithium polymer, lithium ion or nickel cadmium battery to power the deterrent module 155.

In another embodiment, the energy storage modules 165 contain a bank of lithium ion batteries to power all flight systems and secondary electrical components. The energy storage modules 165 might also contain a dedicated lithium polymer, lithium ion or nickel cadmium battery to power the deterrent module 155.

In another embodiment, the energy storage modules 165 contain a bank of nickel cadmium batteries to power all flight systems and secondary electrical components. The energy storage modules 165 might also contain a dedicated lithium polymer, lithium ion or nickel cadmium battery to power the deterrent module 155.

In another embodiment, the energy storage modules 165 contain a hydrogen fuel cell to power all flight systems and secondary electrical components. The energy storage modules 165 might also contain a dedicated lithium polymer, lithium ion or nickel cadmium battery to power the deterrent module 155.

In another embodiment, the energy storage modules 165 contain a fuel tank and generator to power all flight systems and secondary electrical components. In one embodiment, the generator charges a small onboard battery or capacitor bank that all flight systems and secondary electrical components draw from. The energy storage modules 165 might also contain a dedicated lithium polymer, lithium ion or nickel cadmium battery to power the deterrent module 155.

The autonomous recharging terminals 170 enable the drone 100 to electrically and/or mechanically couple itself to the base station 200 in order to accomplish recharging/refilling operations and/or transfer data.

In one embodiment, the autonomous recharging terminals 170 comprises conventional exposed conductive pads on the drone 100 that mate with corresponding pads on the base station 200 when the drone 100 is docked at the base station 200.

In another embodiment, the autonomous recharging terminals 170 comprises magnetic exposed conductive pads on the drone 100 that mate with corresponding pads on the base station 200 when the drone 100 is docked at the base station 200.

In another embodiment, the autonomous recharging terminals 170 comprises spring loaded electrodes (pogo pins) on the drone 100 that mate with corresponding conductive pads on the base station 200 when the drone 100 is docked at the base station 200.

In another embodiment, the autonomous recharging terminals 170 comprises an inductive charging coil on the drone 100 that mates with a corresponding inductive charging coil on the base station 200 when the drone 100 is docked at the base station 200.

In another embodiment, the autonomous recharging terminals 170 comprises an easy to access and autonomously swappable energy storage module 165. In one embodiment, this is swapped by the drone coupling module 225.

In another embodiment, the autonomous recharging terminals 170 comprises an autonomously accessible fuel port. In one embodiment, this is accessed by the drone coupling module 225 to transfer gaseous or liquid fuels.

In another embodiment, the autonomous recharging terminals 170 comprises any combination of the aforementioned embodiments.

Figure 4:
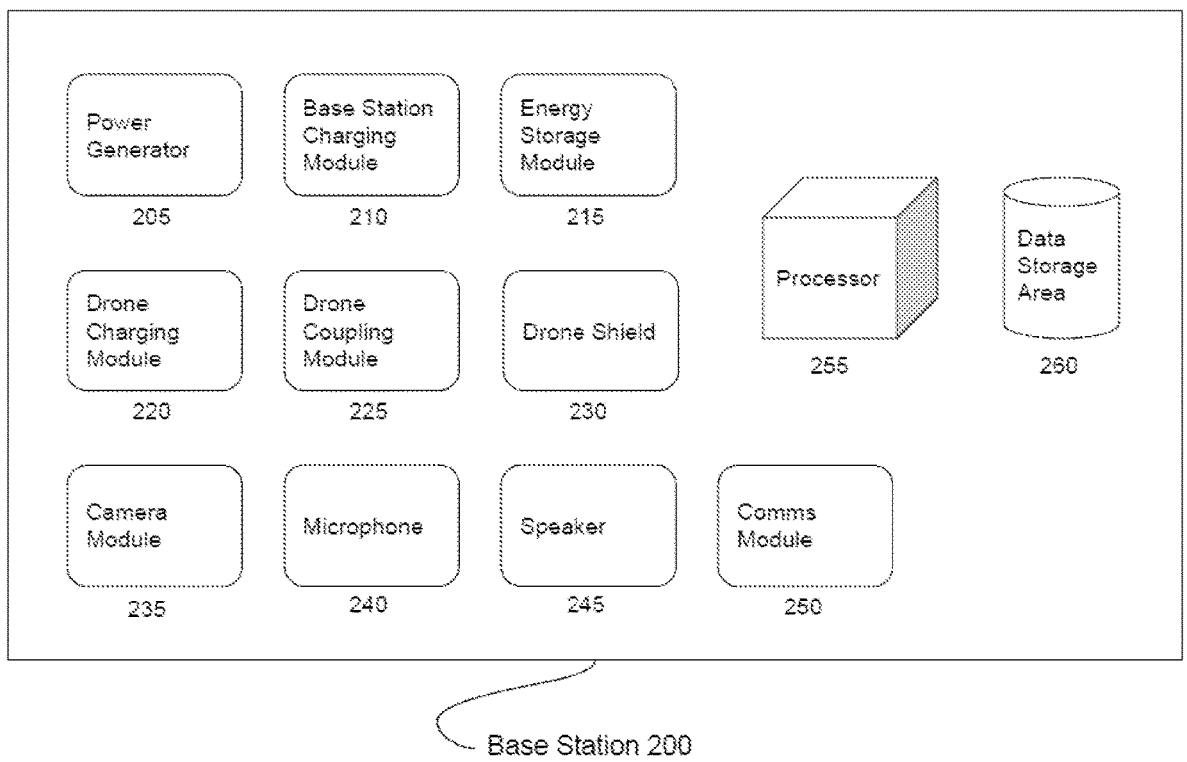
FIG. 4 is a block diagram illustrating an example base station according to an embodiment of the invention.

FIG. 4 is a block diagram illustrating an example base station 200 according to an embodiment of the invention. Base stations 200 are configured to communicate with drones 100 and other base stations 200 and the control center server 300. Networks of base stations 200 form the mesh network described above. Base stations 200 also charge drones 100. Base stations 200 are configured to monitor their environment with cameras and can communicate with nearby humans and processor enabled devices through their microphone/speaker. Base stations 200 also feature the ability to charge themselves. This functionality is executed by a number of modules and systems that comprise the base station 200.

The power generator 205 produces power for the base stations 200 consumption. The power generator 205 feeds its output into the base station charging module 210 for processing before it is used to charge the energy storage module 215.

In one embodiment, the power generator 205 comprises an array of photovoltaic cells.

In another embodiment, the power generator 205 comprises one or more fuel cells.

In another embodiment, the power generator 205 comprises one or more electromechanical generators. One example of an electromagnetic generator is a wind turbine.

In another embodiment, the power generator 205 comprises any combination of the aforementioned embodiments.

The base station charging module 210 inputs the output energy from the power generator 205 or from an external source and puts that energy into the energy storage module 215 by forcing an electric current through it. The base station charging module 210 also monitors the health/capacity/charge state of the energy storage module 215 and makes charging decisions based on that information. It is also capable of sending battery status or an alert if the energy storage module 215 is detected to be unhealthy through the processor 255, data storage area 260 and comms module 250.

In one embodiment, the base station charging module 210 comprises a microprocessor based device that ensures voltage compatibility between the power generator 205 and the energy storage module 215, monitors battery health, and can modify charging cycles based on data received.

The energy storage module 215 is designed to store electricity for use onboard the base station 200.

In one embodiment, the energy storage module 215 contains a bank of lithium polymer batteries to power onboard systems.

In another embodiment, the energy storage module 215 contains a bank of lithium ion batteries to power onboard systems.

In another embodiment, the energy storage module 215 contains a bank of nickel cadmium batteries to power onboard systems.

In another embodiment, the energy storage module 215 contains a bank of lead acid batteries to power onboard systems.

The drone charging module 220 inputs power from the energy storage module 215 and puts that energy into the drone's 100 energy storage modules 165 by forcing an electric current through them and/or pumps gaseous or liquid fuels into the drone 100. The drone charging module 220 also monitors the health/capacity/charge state of the energy storage modules 165 and makes charging decisions based on that information. It is also capable of sending that information through the processor 255, data storage area 260 and comms module 250 to the drone 100 and the control center 300.

In one embodiment, the drone charging module 220 comprises a microprocessor based device that ensures voltage compatibility between the energy storage module 215 and the energy storage modules 165, monitors battery health, can modify charging cycles based on data received, and can transmit that data throughout the network.

In another embodiment, the drone charging module 220 comprises a fuel storage and pumping system.

The drone coupling module 225 ensures that the drone 100 or energy storage module 165 makes solid electrical and or mechanical contact with the base station 200 for charging and data transfer purposes.

In one embodiment, the drone coupling module 225 comprises a number of electromechanical actuators designed to position the drone 100 within the base station 200 in order to facilitate charging and data transfer.

In another embodiment, the drone coupling module 225 comprises an indexed landing pad designed to guide the drone 100 into position during landing operations to facilitate charging and data transfer.

In another embodiment, the drone coupling module 225 comprises an electromagnet designed to guide the drone 100 into position to facilitate charging and data transfer.

In another embodiment, the drone coupling module 225 comprises any of the previous embodiments, plus an energy storage module 165 swapping mechanism. This mechanism would physically remove the energy storage modules 165 from the drone 100 and replace them will charged/filled replacements.

In another embodiment, the drone coupling module 225 comprises any of the previous embodiments, plus servo actuated magnetic electrodes to contact the autonomous recharging terminals 170.

In another embodiment, the drone coupling module 225 comprises any of the previous embodiments, plus servo actuated fuel ports to contact the autonomous recharging terminals 170. This would enable the pumping of gaseous or liquid fuels.

In another embodiment, the drone coupling module 225 comprises any of the previous embodiments, plus conductive landing areas to contact the autonomous recharging terminals 170.

In another embodiment, the drone coupling module 225 comprises any of the previous embodiments, plus an inductive charging coil that can pass current to the drone 100 wirelessly.

The drone shield 230 protects drones 100 from the external environment while they are charging or awaiting deployment.

In one embodiment, the drone shield 230 comprises a number of electromechanical actuators designed to position a metal, plastic or composite drone cover over the landed drone 100. It also includes the drone cover itself and all associated electronic drivers and microprocessors. In one embodiment, the drone cover may be configured with one or more photovoltaic cells.

In another embodiment, the drone shield 230 comprises a number of electromechanical actuators designed to position a soft waterproof fabric over the landed drone 100. It also includes the fabric and all associated electronic drivers and microprocessors.

In another embodiment, the drone shield 230 comprises any of the previous embodiments but is a stand alone structure of the base station 200 system and/or physically attached to the base station 200.

The camera module 235 detects light, translates that light into computer readable data and sends the data to the base station's comms module 250.

In one embodiment, the camera module 235 is comprised of a 1080 p at 60 fps CMOS sensor based camera that outputs H.264 video.

In another embodiment, the camera module 235 is comprised of a 1080 p at 60 fps night vision camera that outputs H.264 video.

The microphone 240 is a transducer that converts sound into a computer readable electrical signal.

In one embodiment, the microphone 240 is a dynamic microphone, which is connected to the processor 255, data storage area 260, and comms module 250. The processor 255 and data storage area 260 may compress the audio input with the help of an audio codec and/or run noise cancellation.

In another embodiment, the microphone 240 is a condenser microphone, which is connected to the processor 255, data storage area 260, and comms module 250. The processor 255 and data storage area 260 may compress the audio input with the help of an audio codec and/or run noise cancellation.

In another embodiment, the microphone 240 is a piezoelectric microphone, which is connected to the processor 255, data storage area 260, and comms module 250. The processor 255 and data storage area 260 may compress the audio input with the help of an audio codec and/or run noise cancellation.

The speaker 245 is designed to convert an electrical audio signal into sound. The speaker 245 can be triggered through the comms module 250 or by the processor 255 and data storage area 260. The speaker is capable of playing prerecorded sounds or real time audio transmissions.

In one embodiment, the speaker 245 comprises a conventional electro-mechanical loudspeaker and potentially an audio amplifier.

In another embodiment, the speaker 245 comprises an electrostatic loudspeaker and potentially an audio amplifier.

In another embodiment, the speaker 245 comprises a highly directional ultrasonic speaker potentially mounted on a gimbal designed to track the communications target.

In another embodiment, the speaker 245 comprises a plasma speaker.

The comms module 250 is a wireless transceiver that is used to transmit and receive data from other transceivers, transmitters and receivers. It is capable of communicating with other drones 100 and base stations 200. The comms module 250 is networked with the base station charging module 210, the drone charging module 220, the camera module 235, the microphone 240, the speaker 245, the processor 255 and the data storage area 260.

In one embodiment, the comms module 250 is a 5 ghz 1 gigabit 1 watt mimo wifi transceiver connected to two 4 element skew planar 5 ghz antennas.

Figure 5:
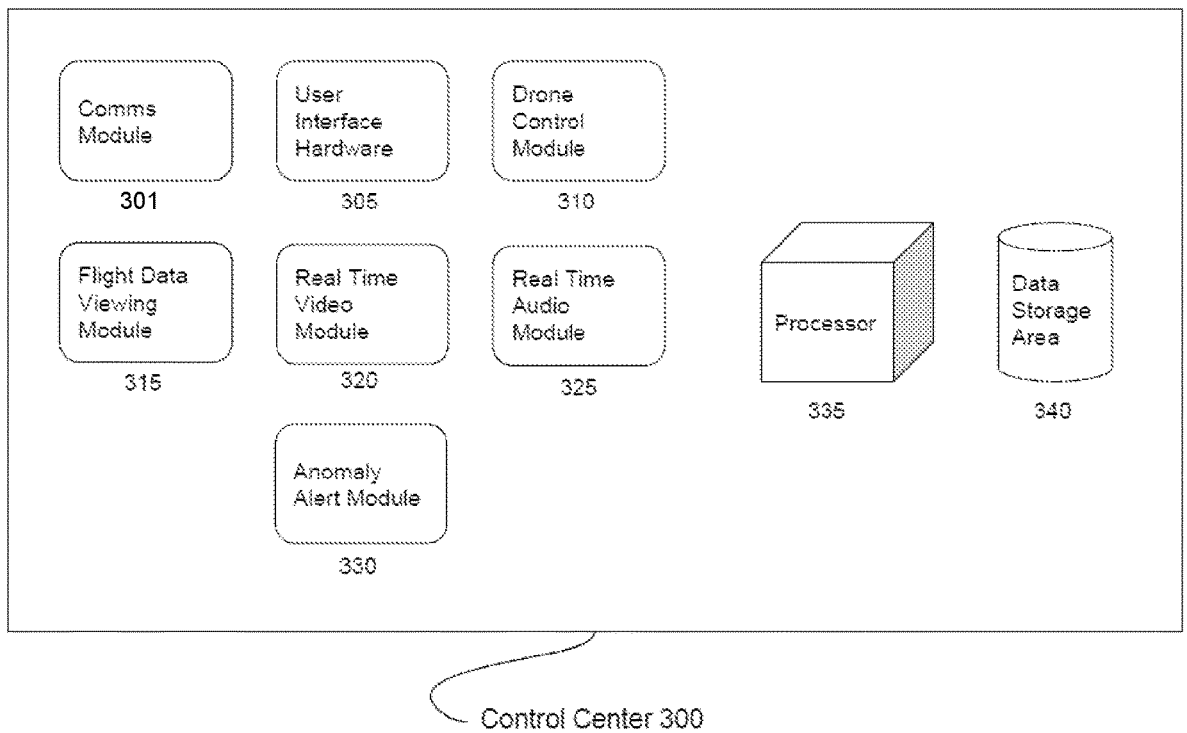
FIG. 5 is a block diagram illustrating an example control center according to an embodiment of the invention.

FIG. 5 is a block diagram illustrating an example control center 300 according to an embodiment of the invention. The control center 300 functions as a communications hub for drones 100 and base stations 200. The control center 300 also autonomously plots drone 100 flight paths when the drone 100 is not being controlled by an operator. The control center 300 also enables human operators to interact with the system 10. This functionality is executed by a number of modules and systems that comprise the control center 300.

The control center 300 comms module 301 communicates with a large number of base stations 200 and drones 100 through the network 60.

In one embodiment, the comms module 301 is a virtual entity that exists in the cloud e.g., on a remote server communicatively coupled via one or more networks. The drones 100 would communicate with base stations 200 which would communicate with each other through a mesh network. Data from the mesh network 204A can be streamed through the internet and terminate at the control center 300 comms module 301.

The user interface hardware 305 enables human operators to understand the status of, interact with and control base stations 200 and drones 100.

In one embodiment, the visual portion of the user interface hardware 305 is accomplished utilizing one or more tv monitors.

In another embodiment, the visual portion of the user interface hardware 305 is accomplished utilizing one or more pairs of virtual reality goggles.

In another embodiment, the control portion of the user interface hardware 305 is accomplished utilizing one or more gamepad controllers.

In another embodiment, the control portion of the user interface hardware 305 is accomplished utilizing one or more joysticks.

In another embodiment, the control portion of the user interface hardware 305 is accomplished utilizing one or more keyboards.

In another embodiment, the audio portion of the user interface hardware 305 is accomplished utilizing an audio headset.

In another embodiment, the user interface hardware 305 comprises any combination of the aforementioned embodiments.

The drone control module 310 autonomously sends flight paths to operating drones 100, adapts organically to ever changing drone 100 utilization, enables human operators to operate individual drones 100 when responding to anomalies, enables human operators to send high level commands to large swarms of drones 100 to accomplish complex tasks, and enables human operators to quickly and easily switch control from one drone 100 to another. The automatic flight path generation capability of the drone control module 310 accounts for drone 100 location, drone 100 charge state, base station 200 charge space availability, drone 100 need, weather and many other relevant variables. In one embodiment, drone control module 310 alerts users (through the user interface hardware 305) of problems within the network. These problems might include severe weather, crashed drones, or the critical charge state of a particular drone 100. The drone control module 310 would utilize the control portion of the user interface hardware 305.

In one embodiment, the drone control module 310 is a virtual entity that exists in the cloud e.g., on a remote server communicatively coupled via one or more networks, which could be accessed through user facing software.

The flight data viewing module 315 enables operators to gain a quantitative understanding of the current status of drones 100 and base stations 200 operating in the network. This may include a sensor readout of the flight sensor suite 120, localization modules 125, base station charging module 210 and drone charging module 220. The flight data viewing module 315 would utilize the visual portion of the user interface hardware 305.

In one embodiment, the flight data viewing module 315 is a virtual entity that exists in the cloud e.g., on a remote server communicatively coupled via one or more networks, which could be accessed through user facing software.

The real time video module 320 enables operators to see the thermal and/or conventional video feeds of drones 100 and base stations 200 in the network. The real time video module 320 would utilize the visual portion of the user interface hardware 305.

In one embodiment, the real time video module 320 is a virtual entity that exists in the cloud e.g., on a remote server communicatively coupled via one or more networks, which could be accessed through user facing software.

The real time audio module 325 enables operators to hear and speak through the audio feeds of drones 100 and base stations 200 in the network. It also enables operators to record audio for future deployment. The real time audio module 325 would utilize the audio portion of the user interface hardware 305.

In one embodiment, the real time audio module 325 is a virtual entity that exists in the cloud e.g., on a remote server communicatively coupled via one or more networks, which could be accessed through user facing software.

The anomaly alert module 330 warns operators when the analysis module 135 detects an anomaly and requests operators to take manual control of the drone 100 to investigate further. The anomaly alert module 330 would utilize the visual and audio portion of the user interface hardware 305.

In one embodiment, the anomaly alert module 330 is a virtual entity that exists in the cloud e.g., on a remote server communicatively coupled via one or more networks, which could be accessed through user facing software.

Figure 6:
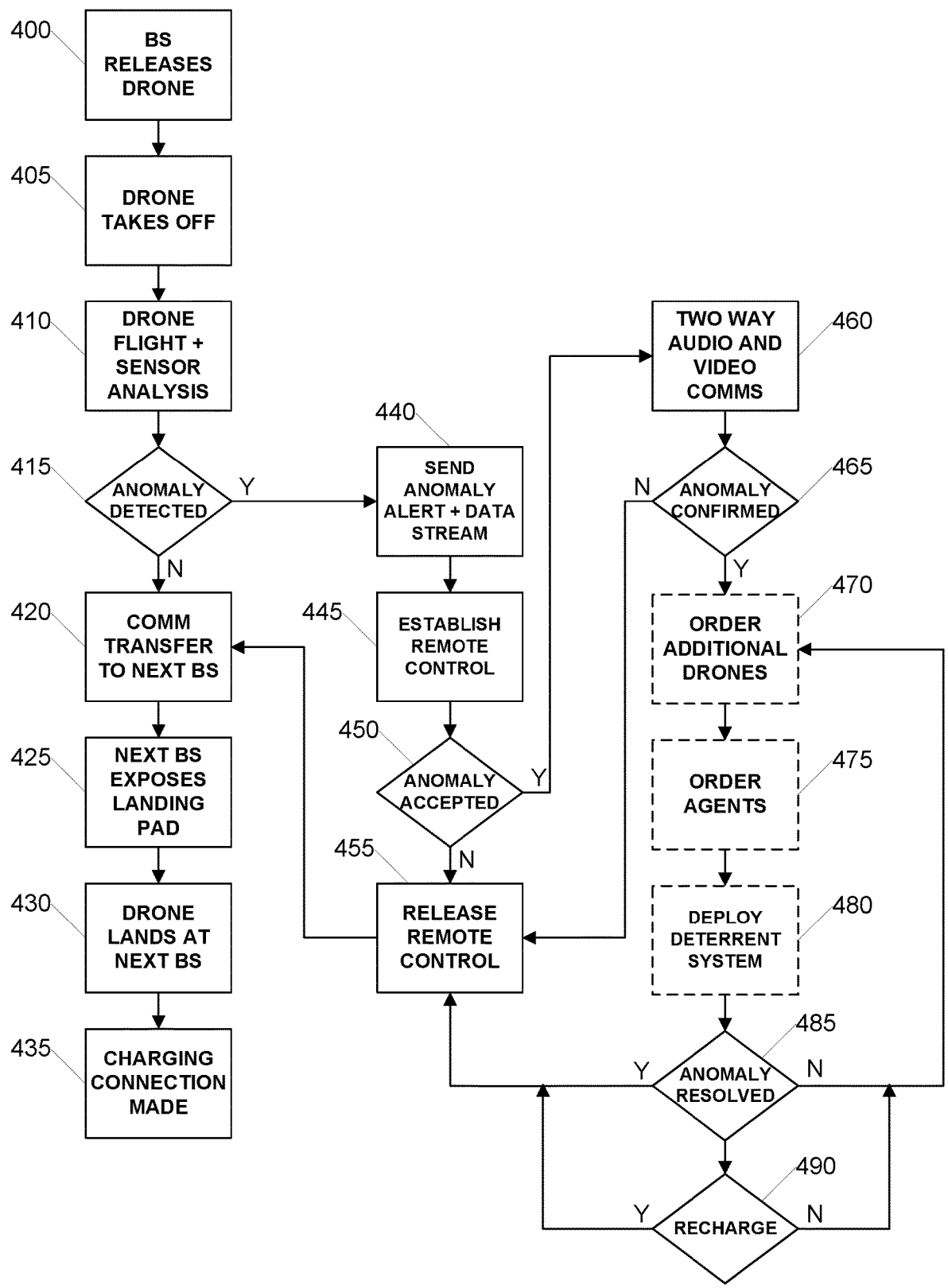
FIG. 6 is a flow diagram illustrating an example process for drone implemented border patrol according to an embodiment of the invention.

FIG. 6 is a flow diagram illustrating an example process for drone implemented border patrol according to an embodiment of the invention. The illustrated process may be implemented by the system described with respect to FIGS. 1-5, 7-11 and 14. The process begins in step 400 with the base station 200 opening it's drone shield 230 and disconnecting itself electrically from the drone's autonomous recharging terminals 170.

At this point, in step 405 the drone 100 autonomously takes off from the base station 200. The drone 100 then begins its flight in step 410 and follows a predetermined waypoint path towards a successive base station 200. This waypoint path may be transmitted to the drone 100 from the control center 300 or pre-stored in memory on the drone 100. During its flight, also in step 410, the drone 100 actively runs computer vision software to detect anomalies/border breaches. To accomplish this task, the drone 100 utilizes its analysis module 135, video camera module 130 and thermal imaging module 140.

If an anomaly or border breach is not detected, as determined in step 415, the drone 100 will continue flying along its waypoint path. Once the signal strength of the base station 200 the drone 100 took off from is weaker than the signal strength of the base station 200 the drone 100 is flying to, a soft communications hand off occurs as shown in step 420. Once the drone 100 reaches the next base station 200, the next base station 200 opens its drone shield 230 in step 425 and waits for the drone 100 to land on the next base station 200 as shown in step 430. Next, the drone 100 and the next base station 200 establish an electrical connection with the drone's autonomous recharging terminals 170. This cycle repeats when the drone 100 is finished charging and/or when it is next requested to deploy.

If an anomaly or border breach is detected in step 415, the drone 100 sends an alert via a network to the control center 300 in step 440 and beings streaming live sensor data including flight telemetry/video/thermal imaging data/sound via a network to the control center 300. The drone 100 also establishes a remote control connection with the control center 300 in step 445 so the control center 300 may remotely control the drone 100. After the anomaly alert is sent to the control center 300, if the anomaly or border breach is not accepted by the control center 300, as determined in step 450, the drone 100 stops streaming live sensor data to the control center 300 and terminates the remote control connection in step 455 and the process returns to step 420 until the drone 100 lands at the next base station 200 for charging.

If the anomaly or border breach is accepted, as determined in step 450, the drone 100 initiates or maintains two way audio communications utilizing its microphone 145 and speaker 160. Two way audio communications advantageously allow for interrogation of the subject that caused the anomaly to be detected. If, after implementing two way audio interrogation in combination with streaming video of the local environment to the control center server 300, the anomaly is not confirmed in step 465, the drone 100 stops streaming live sensor data to the control center 300 and terminates remote control connection in step 455 and the process returns to step 420 until the drone 100 lands at the next base station 200 for charging.

However, if, after implementing two way audio interrogation in combination with streaming video of the local environment to the control center server 300, the anomaly or border breach is confirmed in step 465, the drone 100 might optionally order additional drones 100 to respond in step 470, order human border control agents to respond in step 475, and/or utilize its deterrent module 155. The deterrent module 155 might be used to encourage the subject to leave or incapacitate the subject to lessen the subject's ability to harm border patrol agents when they arrive in person.

Once the anomaly has been rectified, the drone 100 stops streaming live sensor data to the control center 300 and terminates remote control connection in step 455 and the process returns to step 420 until the drone 100 lands at the next base station 200 for charging. If at any point during flight the drone 100 determines that its batteries are nearing a threshold limit for being too low to safely return to the nearest base station 200, as determined in step 490, the drone 100 stops streaming live sensor data to the control center 300 and terminates remote control connection in step 455 and the process returns to step 420 until the drone 100 lands at the next base station 200 for charging. This drone 100 is then seamlessly replaced by another drone 100 requisitioned from the network by the drone control module 310.

Figure 7:
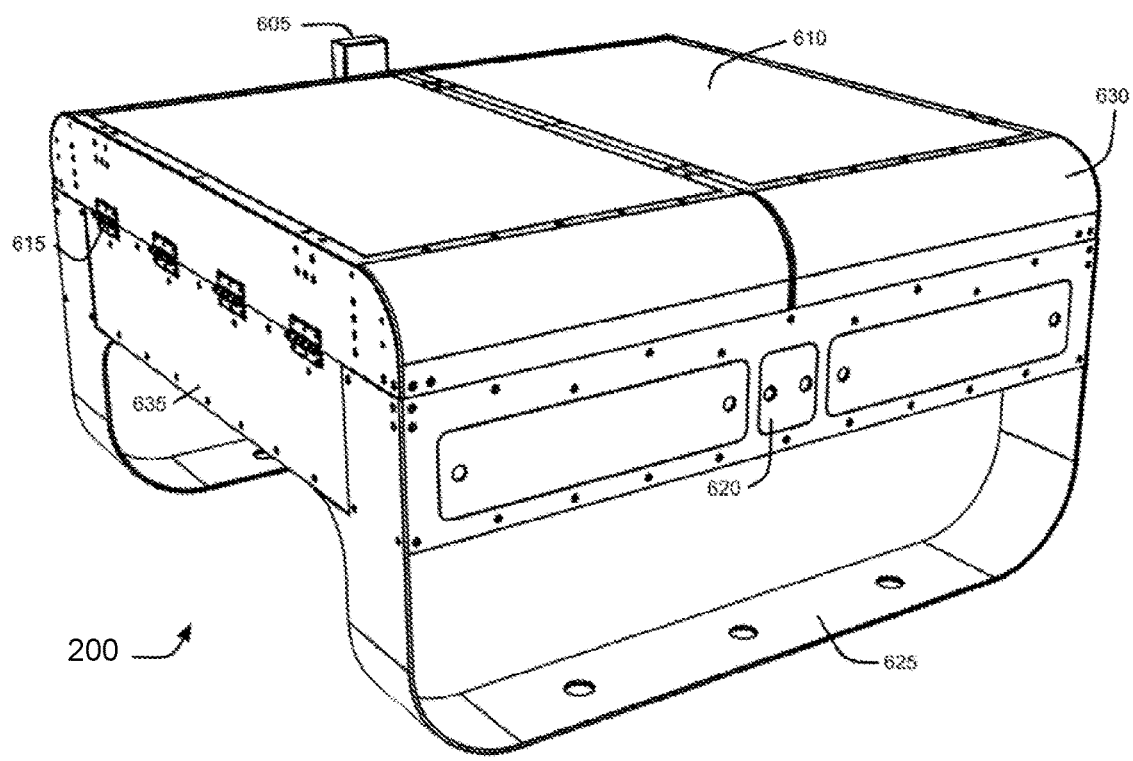
FIG. 7 is a perspective view diagram illustrating a base station in a closed position according to an embodiment of the invention.

FIG. 7 is a perspective view diagram illustrating a base station 200 in a closed position according to an embodiment of the invention.

In one embodiment, base stations 200 feature formed sheet metal base station bodies 635. These bodies contain internal electronics 620. The base station 200 internal electronics 620 may contain one part or all of the subcomponents of the power generator 205, base station charging module 210, energy storage module 215, drone charging module 220, drone coupling module 225, drone shield 230, camera module 235, microphone 240, speaker 245, comms module 250, processor 255 and data storage area 260. The base station 200 internal electronics may also include one or more processing systems such as later described with respect to FIG. 14.

In one embodiment, the base stations 200 also include base station legs 625. These legs can be mounted on an elevated platform for permanent installation. Multiple base stations 200 can be mounted to the same elevated platform.

In one embodiment, base stations 200 also include attached base station doors 630. These doors pivot on hinges 615 and can protect an internal drone 100 from the environment. The doors also feature integrated photovoltaic panels 610. The photovoltaic panels are one embodiment of the power generator 205. The doors (and associated motors/drivers/sensors/mechanics) are one embodiment of the drone shield 230.

In one embodiment, base stations 200 can be commanded over the network 60 by drones 100 or control centers 300. In another embodiment, base stations 200 can be commanded via a direct wireless communication link from a drone 100. Example network or direct commands to the base station 200 may include commands to open or close the doors to accommodate the drone 100 when landing or taking off. In one embodiment, the base stations 200 utilize the comms module 605/250 to receive these requests. Base stations 200 may also autonomously open for charging. In one embodiment, base stations 200 utilize onboard sensors to detect drones 100 in landing proximity to the base station 200. When such a drone 100 is detected, the base station 200 autonomously opens to facilitate landing the drone 100 and subsequently charging the drone 100.

Figure 8:
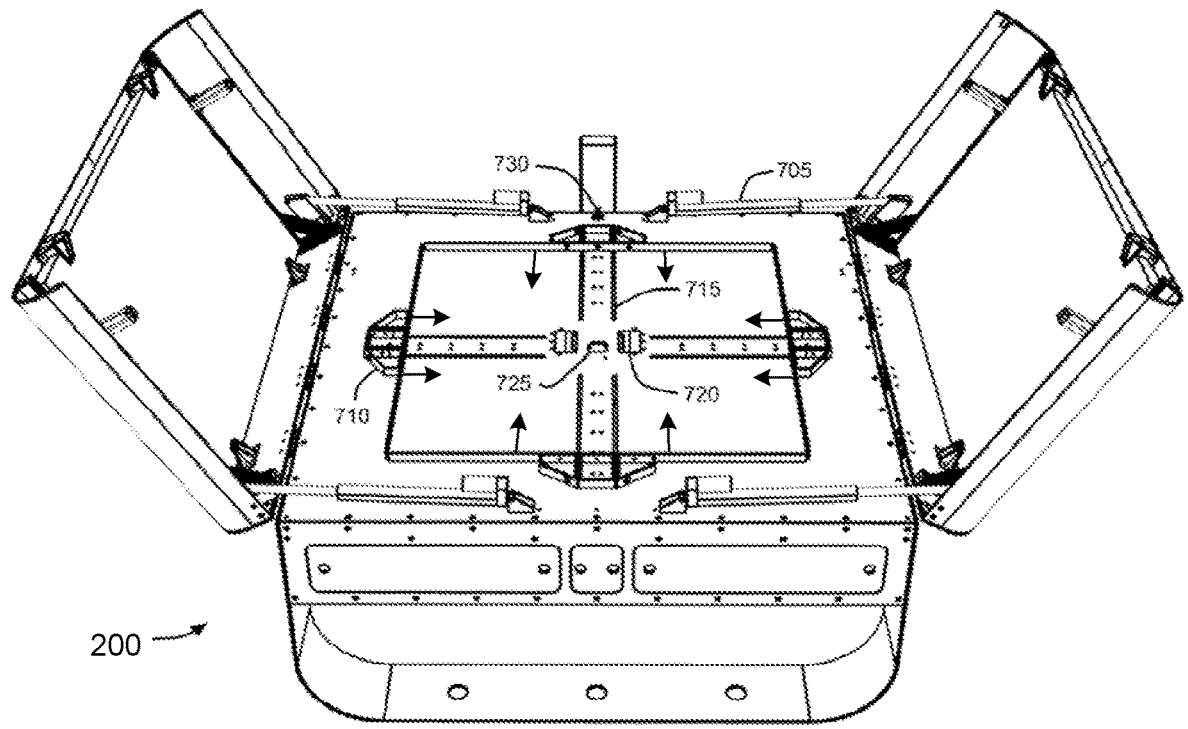
FIG. 8 is a perspective view diagram illustrating a base station in an open position according to an embodiment of the invention.

FIG. 8 is a perspective view diagram illustrating a base station 200 in an open position according to an embodiment of the invention.

In one embodiment, the base station doors 630 are actuated by four electric linear actuators 705. These linear actuators 705 rotate the base station doors 630 open and closed along the hinges 615. In another embodiment, the actuators are hydraulic cylinders, pneumatic cylinders, linear motors or any combination of the aforementioned actuators. The door opening system might also contain a single or multiple sensor systems. In one embodiment, the base station door sensor 730 is a microswitch. The sensor package might include one or more rotary encoders, microswitches, ultrasonic sensors, lidars, current sensors or any combination of the aforementioned sensors.

In one embodiment, after the base station doors 630 are open, the IR Emitter 725 powers on. This emitter is part of the drone coupling module 225 and is utilized by the drone localization modules 125 to precisely land.

In one embodiment, landing inaccuracy or yaw irregularities of the drone 100 are corrected by four pusher assemblies 710. The pusher assemblies 710 move towards the center of the base station 200 in accordance with the directional arrows. The pusher assemblies 710 move in opposing pairs along pusher tracks 715. As they move, they push the drone 100 into a centered position by making contact with the drone pusher legs 1095. When fully extended, each pusher assembly 710 pair makes direct contact with all four drone pusher legs 1095 on the drone 100. The extension of the first pair corrects for yaw irregularities and x position, but not y position. The first pair then retracts to allow for the extension of the second pair. The second opposing pair then corrects for y position. This extension of the second pair again makes direct contact with all four pusher legs. After both operations are complete, any landing yaw irregularities, x position or y position errors are corrected. To conclude, the second pair retracts. In one embodiment, the pusher assemblies 710 are actuated by four electric linear actuators. These linear actuators may move the pusher assemblies 710 along internal tracks. In another embodiment, the actuators are hydraulic cylinders, pneumatic cylinders, linear motors or any combination of the aforementioned actuators. The drone pusher system might also contain one or multiple sensor systems. The sensor package might include one or more rotary encoders, microswitches, hall effect sensors, ultrasonic sensors, lidars, current sensors or any combination of the aforementioned sensors.

Figure 9:
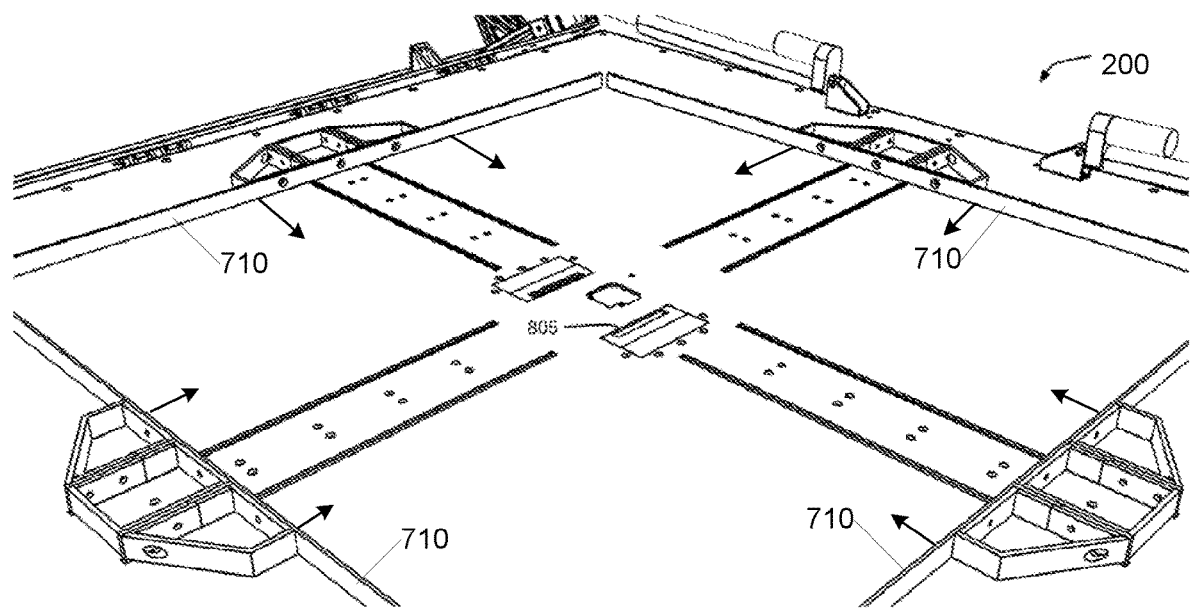
FIG. 9 is a perspective view diagram illustrating a base station with a retracted charging arm according to an embodiment of the invention.

FIG. 9 is a perspective view diagram illustrating a base station 200 with a retracted charging arm 905 according to an embodiment of the invention. In the illustrated embodiment, the pusher assemblies 710 are configured to move along the pusher tracks 715 in accordance with the directional arrows. The pusher assemblies 710 move towards the center of the base station 200 in opposing pairs to center the drone 100 on the landing platform. When the drone 100 is positioned in a central location on the landing platform, the charger arm holes are properly positioned with respect to the drone 100 for charging on the drone 100 energy storage modules 165 by way of making electrical contact between the charger arm magnetic electrodes 910 and a corresponding recharging terminals 170 on the drone 100.

Figure 10:
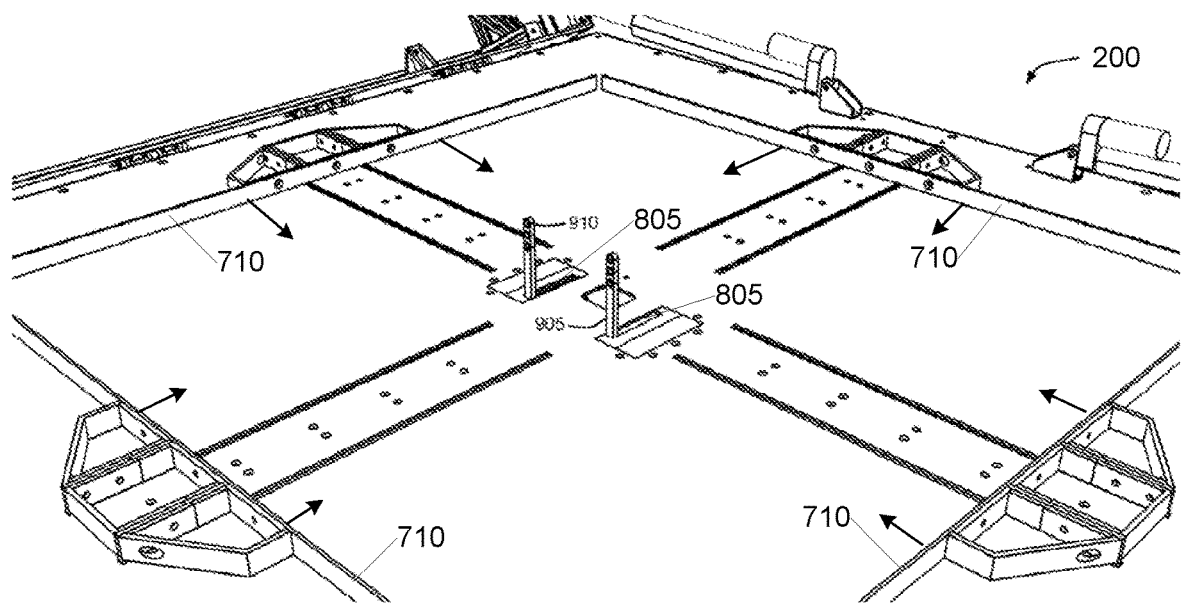
FIG. 10 is a perspective view diagram illustrating a base station with an extended charging arm according to an embodiment of the invention.

FIG. 10 is a perspective view diagram illustrating a base station 200 with an extended charging arm 905 according to an embodiment of the invention.

In one embodiment, after the drone 100 is precisely positioned on the landing platform of the base station 200, the charger arms 905 rotate out from under the charger arm panel 720 through the charger arm holes 805. The charger arms 905 move into a position where electrical communication is established between the base station 200 and the drone 100 and recharging of the drone energy storage modules 165 commences. After the drone 100 is fully charged or in response to the drone 100 being requested by the network, the charger arms 905 rotate back into the charger arm panel 720 through the charger arm holes 805. In one embodiment, the charger arms 905 are actuated by servo motors. In another embodiment, the charger arms 905 are actuated brushed dc motors, brushless motors, and or stepper motors. The charger arm system might also contain one or multiple sensor systems. The sensor package might include one or more rotary encoders, microswitches, hall effect sensors, ultrasonic sensors, lidars, electrical continuity sensors, current sensors or any combination of the aforementioned sensors.

In one embodiment the charger arms 905 contain one or more charger arm magnetic electrodes 910. These electrodes contact the autonomous recharging terminals 170 on the drone 100 to enable the charging of the drone 100 energy storage modules 165 by the base station 200.

Figure 11:
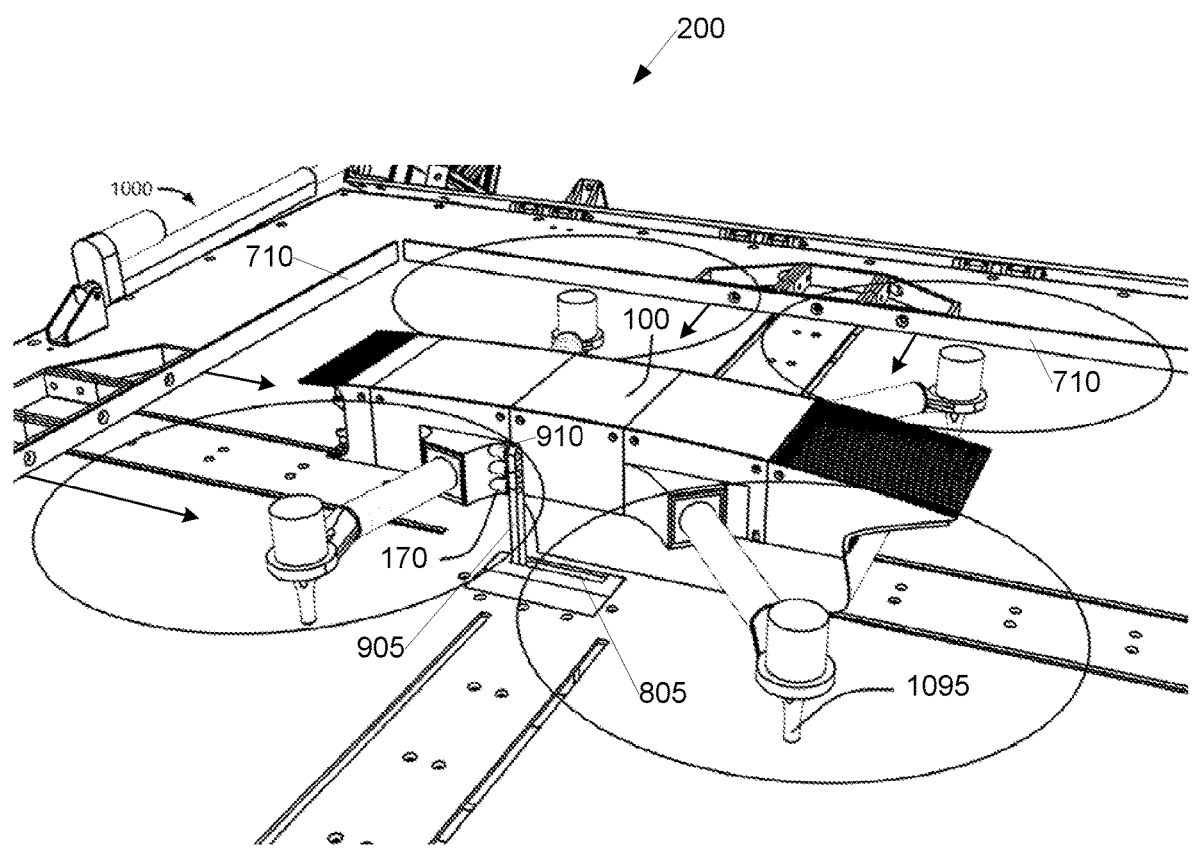
FIG. 11 is a perspective view diagram illustrating a base station with a docked and charging drone according to an embodiment of the invention.

FIG. 11 is a perspective view diagram illustrating a base station 200 with a docked and charging drone 100 according to an embodiment of the invention. In the illustrated embodiment, the drone 100 is positioned on the landing platform. The pusher assemblies 710 have already moved in pairs in accordance with the directional arrows and made contact with the drone pusher legs 1095 to center the drone 100 on the landing platform such that the one or more charging arms 905 are properly positioned with respect to the recharging terminals 170 of the drone 100. In the illustrated embodiment, the charging arm 905 has extended out and the charger arm magnetic electrodes 910 have made electrical connection with the recharging terminals 170 of the drone 100.

Figure 12:
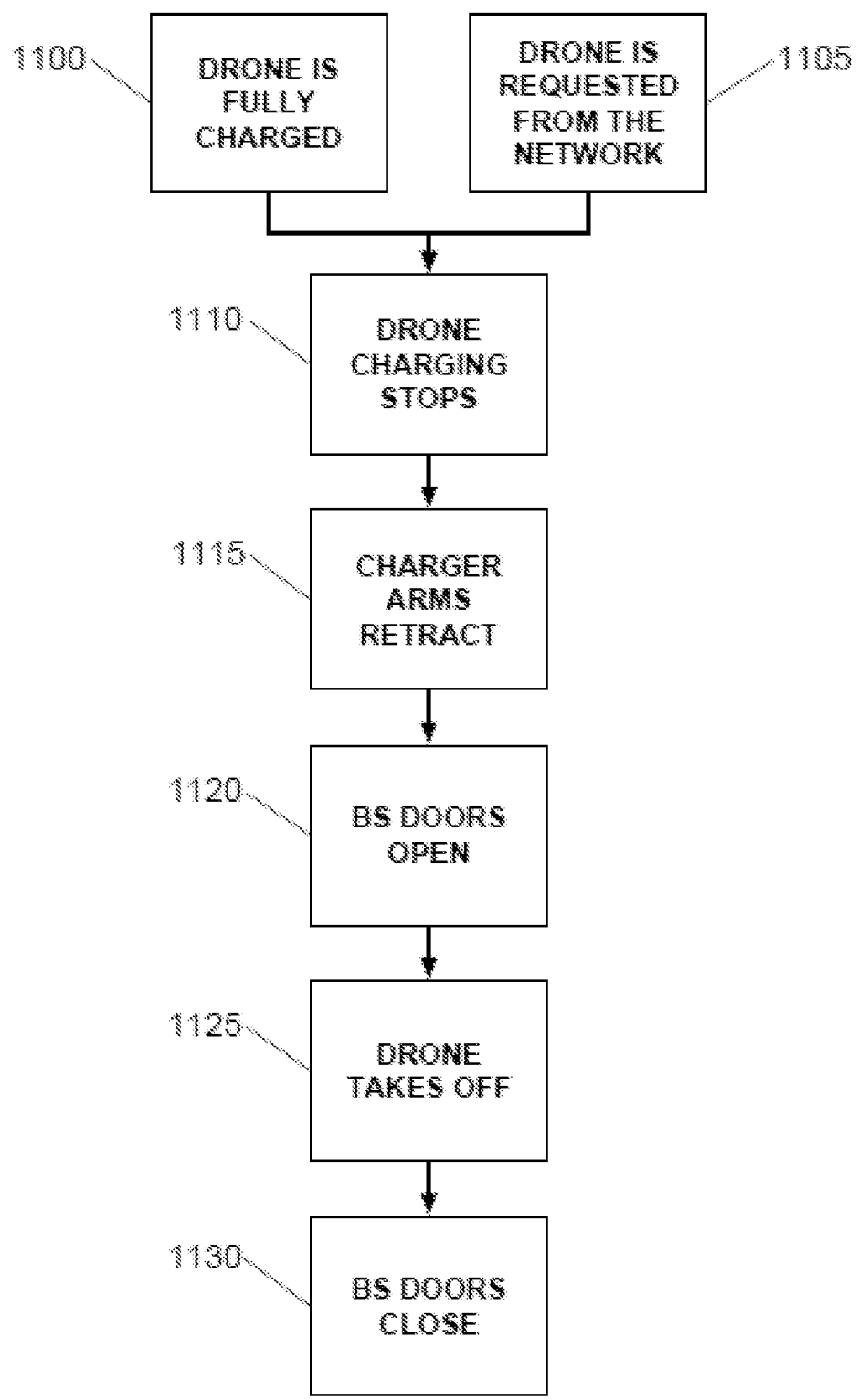
FIG. 12 is a flow diagram illustrating an example process for taking off a drone according to an embodiment of the invention.

FIG. 12 is a flow diagram illustrating an example process for taking off a drone according to an embodiment of the invention. The illustrated process may be implemented by the system described with respect to FIGS. 1-5, 7-11 and 14.

In step 1100/1105, a drone 100, base station 200 or control center 300 commands the base station 200 to begin take off procedures. This can occur when the drone 100 is fully charged or when the drone 100 is needed for service. In one embodiment, this command is sent over the network 60 and is received by the base station 200 comms module 250. In another embodiment, the command is sent by the drone 100 directly to the base station 200.

In step 1110 the base station 200 drone charging module 220 stops recharging the drone 100 energy storage module 165.

In step 1115, the charger arms 905 rotate back under the charger arm panel 720 through the charger arm holes 805. The attached charger arm magnetic electrodes 910 disconnect from the drone 100 autonomous recharging terminals 170.

In step 1120, the base station 200 linear actuators 705 are energized and force the base station doors 630 open to facilitate a take off. Sensors might be used to determine the position of the door and deactivate the linear actuators 705.

In step 1125, the drone 100 flight control computer 115 controls the drone 100 to cause the drone to autonomously take flight and lift off from the base station 200.

In step 1130, the base station 200 linear actuators 705 are energized and force the base station doors 630 closed. Sensors might be used to determine the position of the door and deactivate the linear actuators 705.

Figure 13:
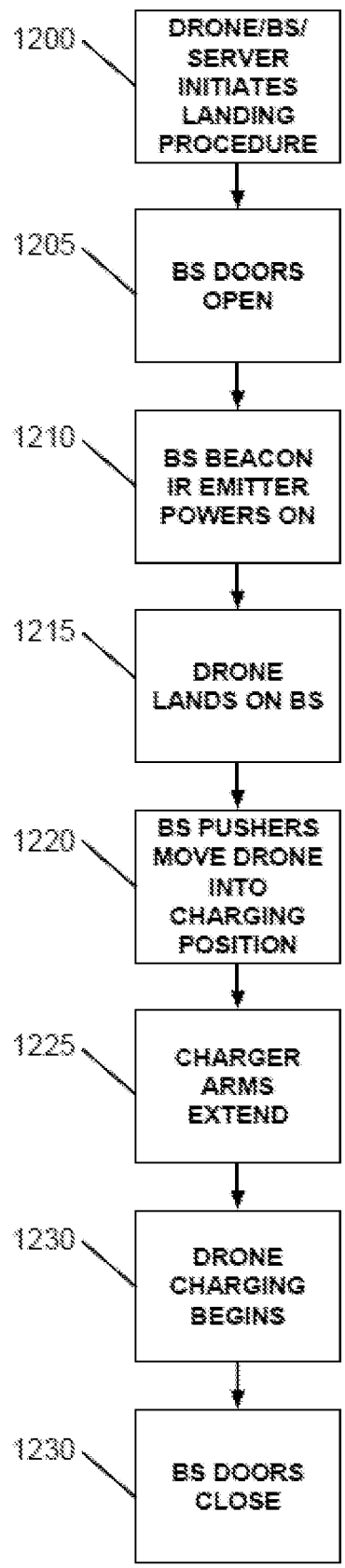
FIG. 13 is a flow diagram illustrating an example process for landing a drone according to an embodiment of the invention.

FIG. 13 is a flow diagram illustrating an example process for landing a drone according to an embodiment of the invention. The illustrated process may be implemented by the system described with respect to FIGS. 1-5, 7-11 and 14.

In step 1200, a drone 100, base station 200 or control center 300 commands the base station 200 to begin landing procedures. In one embodiment, this command is sent over the network 60 and is received by the base station 200 comms module 250. In another embodiment, this command is sent directly to the base station 200 comms module 250 by the drone 100 via a wireless communication link.

In step 1205, the base station 200 linear actuators 705 are energized and force the base station doors 630 open to facilitate landing. Sensors might be used to determine the position of the door and deactivate the linear actuators 705.

In step 1210, the base station IR Emitter 725 energizes to enable the drone 100 precise localization module 125 to detect the base station 200 and land. The localization module 125 detects the IR beacon, localizes the drone 100 in space in relation to the base station 200 and helps the flight system 1005 autonomously land the drone 100 on the base station 200.

In step 1215, the drone 100 flight control computer 115 autonomously lands the drone 100 on the base station 200. Utilizing its sensor suite, the drone 100 attempts to land in the exact center of the base station 200.

In step 1220, the base station 200 attempts to correct for whatever position inaccuracy or yaw irregularities exist in the landing due to wind or other factors. The pusher assemblies 710 move towards the center of the base station 200 in opposing pairs along pusher tracks 715. As they move, they make contact with the drone pusher legs 1095 and push the drone 100 into position by applying force to the drone pusher legs 1095. The extension of the first pair of pusher assemblies 710 corrects for yaw irregularities and x position, but not y position. The first pair of pusher assemblies 710 then retracts to allow for the extension of the second pair of pusher assemblies 710. The second opposing pair of pusher assemblies 710 then move towards the center of the base station 200 in opposing directions along pusher tracks 715 and make contact with the drone pusher legs 1095 and push the drone 100 into position by applying force from opposite directions to the drone pusher legs 1095. This second movement of the second pair of pusher assemblies corrects for y position of the drone 100. After both opposing force operations are complete, any landing yaw irregularities, x position or y position errors are corrected. When the second movement is completed and the drone 100 is properly positioned on the landing platform, the second pair of pusher assemblies 710 retracts to their starting position.

After the drone 100 is precisely positioned within the base station 200, in step 1225 the charger arms 905 rotate out from under the charger arm panel 720 through the charger arm holes 805. The attached charger arm magnetic electrodes 910 then contact the drone 100 autonomous recharging terminals 170 and establish electrical communication between the drone 100 and base station 200 so that charging may commence.

In step 1230 the base station 200 drone charging module 220 begins to recharge the drone 100 energy storage modules 165.

In step 1235, the base station 200 linear actuators 705 are energized and force the base station doors 630 closed to protect the drone 100 during recharging. Sensors might be used to determine the position of the door and deactivate the linear actuators 705.

Figure 14:
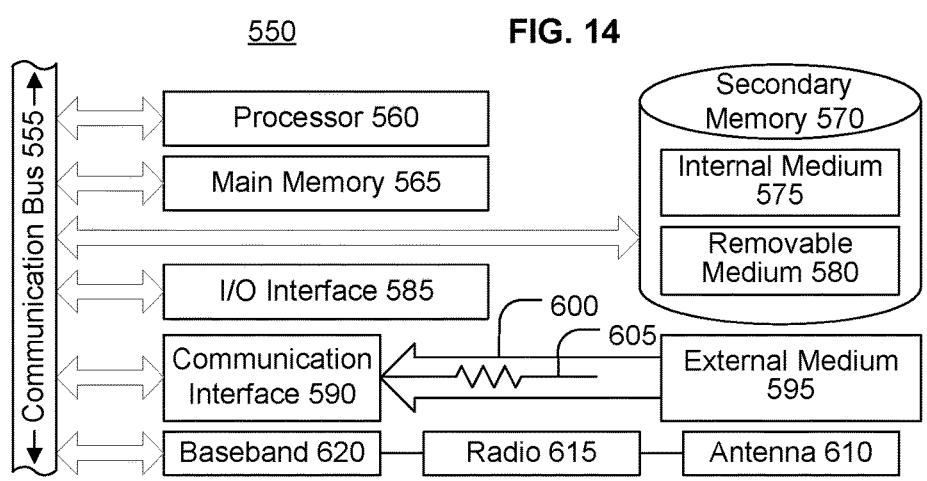
FIG. 14 is a block diagram illustrating an example wired or wireless processor enabled device that may be used in connection with various embodiments described herein.

FIG. 14 is a block diagram illustrating an example wired or wireless system 550 that may be used in connection with various embodiments described herein. For example the system 550 may be used as or in conjunction with a drone 100 or a base station 200 or a control center server as previously described with respect to FIGS. 1-5 and 6-11. The system 550 can be a conventional personal computer, computer server, personal digital assistant, smart phone, tablet computer, or any other processor enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include a internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 570. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the system 550.

System 550 may also include an input/output ("I/O") interface 585. The I/O interface 585 facilitates input from and output to external devices. For example the I/O interface 585 may receive input from a keyboard or mouse and may provide output to a display. The I/O interface 585 is capable of facilitating input from and output to various alternative types of human interface and machine interface devices alike.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown) that are executable by processor 560.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A base station apparatus comprising:
a non-transitory computer readable medium configured to store executable programmed modules;

a processor communicatively coupled with the non-transitory computer readable medium configured to execute programmed modules stored therein;

a power generator configured to generate electrical energy;

an energy storage system configured to store electrical energy;

a charging system configured to receive electrical energy from the power generator or a portable energy storage system and transfer electrical energy from the power generator or a portable energy storage system to the energy storage system;

a communication system configured to wirelessly communicate with one or more drone apparatuses and communication with one or more control center servers via a wired or wireless network;

a drone coupling system configured to support one or more drone apparatuses during execution of a takeoff or landing maneuver by the one or more drone apparatuses;

a drone charging system electrically coupled to one or more drone apparatuses via the drone coupling system and configured to provide electrical energy to one or more electrically coupled drone apparatuses; and a plurality of pusher assemblies configured to position a drone apparatus on the drone coupling system for charging by the drone charging system, wherein a first pusher assembly and a second pusher assembly form a first opposing pair of pusher assemblies, wherein the first pusher assembly moves in a first direction and the second pusher assembly moves in a second direction opposite the first direction and the combined movement of the first pusher assembly and the second pusher assembly presses the drone apparatus into a desired position for charging.

2. The base station apparatus of claim 1, wherein the drone charging system is electrically coupled to the energy storage system and provides electrical energy from the energy storage system to one or more electrically coupled drone apparatuses.

3. The base station apparatus of claim 1, wherein the drone charging system is electrically coupled to the power generator system and provides electrical energy from the power generator system to one or more electrically coupled drone apparatuses.

4. The base station apparatus of claim 1, wherein the drone charging system is electrically coupled to the charging system and provides electrical energy from the charging system to one or more electrically coupled drone apparatuses.

5. The base station apparatus of claim 1, wherein the drone charging system is configured to extend upward through a charger arm hole in a surface of the drone coupling system to electrically connect with the drone apparatus for charging.

6. The base station apparatus of claim 5, wherein the drone charging system is configured to retract downward through a charger arm hole in a surface of the drone coupling system to electrically disconnect from the drone apparatus after charging.

7. The base station apparatus of claim 1, further comprising a drone shield configured to protect one or more drone apparatuses supported by the drone coupling system.

8. The base station apparatus of claim 7, wherein the drone shield comprises one or more doors configured to open along one or more hinges.

9. The base station apparatus of claim 1, further comprising a sensor system configured to sense information about a local environment of the base station and provide sensed information to the one or more control center servers via the wired or wireless network.

10. The base station apparatus of claim 9, wherein the sensor system comprises at least one of a camera, an infrared camera, a thermal camera, and a microphone.

11. The base station apparatus of claim 1, further comprising a speaker configured to provide audio to the local environment, wherein the provided audio is stored in the non-transitory computer readable medium or received from the control center server via the wired or wireless network.

12. The base station apparatus of claim 1, wherein a third pusher assembly and a fourth pusher assembly form a second opposing pair of pusher assemblies, wherein the third pusher assembly moves in a third direction and the fourth pusher assembly moves in a fourth direction opposite the third direction and the combined movement of the first pusher assembly and the second pusher assembly and the third pusher assembly and the fourth pusher assembly presses the drone apparatus into a desired position for charging.

13. A method for border protection comprising:
by a first base station:
supporting a first drone apparatus and charging the first drone apparatus;
by the first drone apparatus:
executing a takeoff maneuver from the first base station;
executing a predetermine flight path;
sensing information about a local environment of the first drone apparatus during execution of the predetermined flight path;
analyzing the sensed information to determine the presence of an anomaly in the local environment of the first drone apparatus;
if an anomaly is determined not to be present in the local environment of the first drone apparatus,
landing at a second base station;
if an anomaly is determined to be present in the local environment of the first drone apparatus,
transferring flight control of the first drone apparatus to a control center;
by the control center:
receiving sensed information about the local environment of the first drone apparatus from the first drone apparatus;
analyzing the sensed information about the local environment of the first drone apparatus from the first drone apparatus; and
sending audio information to the first drone apparatus to be provided to the local environment of the first drone apparatus via a speaker on the first drone apparatus.

14. The method of claim 13, further comprising:
determining that a previously identified anomaly is resolved;
transferring flight control of the first drone apparatus back to the first drone apparatus; and
by the first drone apparatus, landing at the second base station.

15. The method of claim 13, further comprising by the control center subsequent to determining that an anomaly is present in the local environment of the first drone apparatus:
establishing communication with a second drone apparatus; and instructing the second apparatus to fly to the local environment of the first drone apparatus.

16. The method of claim 13, further comprising by the control center subsequent to determining that an anomaly is present in the local environment of the first drone apparatus:
  sending a request for one or more border patrol agents to arrive at the local environment of the first drone apparatus.

17. The method of claim 13, further comprising by the control center subsequent to determining that an anomaly is present in the local environment of the first drone apparatus:
  instructing the first drone apparatus to deploy a deterrent system within the local environment of the first drone apparatus.

* * * * *